United States Patent [19]
Renz

[11] Patent Number: 6,068,292
[45] Date of Patent: May 30, 2000

[54] CONTROLLING GAS FLOW IN A HYBRID INFLATOR

[75] Inventor: Robert N. Renz, Denver, Colo.

[73] Assignee: OEA, Inc., Aurora, Colo.

[21] Appl. No.: 08/977,963

[22] Filed: Nov. 25, 1997

[51] Int. Cl.⁷ .................................................. B60R 21/26
[52] U.S. Cl. ........................................... 280/737; 280/741
[58] Field of Search ................................ 280/737, 736, 280/740, 741, 742

[56] References Cited

U.S. PATENT DOCUMENTS

| | | | |
|---|---|---|---|
| 3,653,684 | 4/1972 | Plumer | 280/734 |
| 3,774,807 | 11/1973 | Keathley et al. | 222/3 |
| 3,788,667 | 1/1974 | Vancil | 280/737 |
| 3,901,530 | 8/1975 | Radke | 280/736 |
| 3,948,540 | 4/1976 | Meacham | 280/735 |
| 3,960,390 | 6/1976 | Goetz | 280/731 |
| 3,966,226 | 6/1976 | Roth | 280/737 |
| 4,131,300 | 12/1978 | Radke et al. | 280/737 |
| 5,131,680 | 7/1992 | Coultras et al. | 280/737 |
| 5,199,740 | 4/1993 | Frantom et al. | 280/736 |
| 5,226,667 | 7/1993 | Coultas | 280/734 |
| 5,230,531 | 7/1993 | Hamilton et al. | 280/737 |
| 5,242,194 | 9/1993 | Popek | 280/737 |
| 5,273,312 | 12/1993 | Coultras et al. | 280/737 |
| 5,351,989 | 10/1994 | Popek et al. | 280/737 |
| 5,360,232 | 11/1994 | Lowe et al. | 280/741 |
| 5,423,570 | 6/1995 | Kort et al. | 280/736 |
| 5,456,492 | 10/1995 | Smith et al. | 280/737 |
| 5,462,307 | 10/1995 | Webber et al. | 280/737 |
| 5,602,361 | 2/1997 | Hamilton et al. | 102/288 |
| 5,630,618 | 5/1997 | Hamilton et al. | 280/736 |

*Primary Examiner*—Peter C. English
*Attorney, Agent, or Firm*—Sheridan Ross P.C.

[57] ABSTRACT

A hybrid inflator for an inflatable safety system is provided. The hybrid inflator is configured to provide for efficient mixing of hot combustion gases from combustion of the propellant and other combustible materials with the cooler pressurized medium in the stored gas housing. The mixing of the combustion gases and the pressurized medium provides an output gas having a substantially uniform composition and temperature.

13 Claims, 3 Drawing Sheets

CONTROLLING GAS FLOW IN A HYBRID INFLATOR

This application relates to U.S. Pat. No. 5,788,275 issued Aug. 4, 1998.

FIELD OF THE INVENTION

The present invention generally relates to the field of inflatable safety systems and, more particularly, to a hybrid inflator.

BACKGROUND OF THE INVENTION

The evolution of inflators for automotive inflatable safety systems has resulted in the development of pressurized gas-only inflators, propellant-only inflators, and hybrid inflators. There are of course many design considerations for each of the above-noted types of inflators. In all three systems, two primary design considerations are that the air/safety bag must be expanded a predetermined amount in a predetermined amount of time in order to be operationally effective. As such, substantial development efforts have been directed to how the flow path is established between the inflator and the air/safety bag and how the subsequent flow is provided to the air/safety bag such that the above-identified objectives can be met. In hybrid inflators, which utilize both a release of a stored, pressurized gas and an ignition of a heat-generating material, such as a propellant, the manner of establishing the flow path to the air/safety bag and the manner of igniting the propellant must both be addressed in a way which meets the above-noted objectives.

SUMMARY OF THE INVENTION

The present invention relates to a hybrid inflator for an inflatable safety system that provides a novel path for inflation gases to an air/safety bag. The hybrid inflator has an inflator housing which stores an appropriate pressurized medium (e.g., fluid and/or gas) and a gas generator which stores an appropriate gas/heat-generating material or propellant for augmenting the flow to the air/safety bag of the inflatable safety system. A closure disk (or outlet closure device) initially isolates the hybrid inflator from this air/safety bag. An activation (or initiator) assembly is provided which includes at least one combustible material which is ignited when activation of the system is desired/required. Combustion products resulting from the activation assembly come into direct contact with the propellant to ignite the same. These same combustion products from the activation assembly also propel a projectile through this particular closure disk to initiate the flow from the inflator to the air/safety bag via an outlet in the inflator housing.

The hybrid inflator includes a mixing device operatively associated with the gas generator for mixing the combustion products from the combustible material in the activation assembly, the gas from combusting the propellant, and/or the pressurized medium (collectively referred to as the "inflation gases"). The device causes the inflation gases to move in a first direction and then in a second direction opposite the first direction. The first and second directions are oriented relative to the longitudinal axis of the inflator housing.

In one configuration, the mixing device includes an inner shroud that extends from a location adjacent to the gas generator along the longitudinal extent of the inflator housing. An outer shroud, that extends for a shorter length along the longitudinal extent of the inflator housing, can also be disposed radially outwardly from the inner shroud to facilitate mixing. The inner and outer shrouds collectively define an annular outlet.

The mixing device can provide inflation gases exiting the outlet from the inflator housing that have a substantially uniform composition and temperature. As will be appreciated, the pressurized medium has a temperature that is substantially the same as the ambient temperature outside of the inflator housing before activation of the activation assembly. The combustion products from the activation assembly and the propellant gases from combusting the propellant (collectively referred to as "the combustion gases") have relatively high temperatures when generated. The mixing device causes efficient mixing of the hot combustion gases and the cooler pressurized medium and thereby causes heat to be transferred rapidly from the hot combustion gases to the pressurized medium. An important objective served by the mixing device is a sufficient or desired reduction associated with the temperature of resulting inflation gases that exit the inflator housing after activation of the inflator. In that regard, such mixing is expected to eliminate the possibility of erosion (and enlargement) of outlets located in the path of flow of the inflating gases and/or flaming of the inflation gases upon or after discharge from the outlet of the inflator housing.

The projectile can provide a sealing function in addition to rupturing the first closure disk to initiate the flow to the air/safety bag. The projectile may be disposed within an end of the gas generator and at least partially aligned with the first closure disk. By selecting an appropriate configuration for the projectile and/or its interrelationship with the end of the gas generator through which it passes to rupture the first closure disk, the projectile can seal this end of the gas generator. This may be desirable to force the propellant gases and/or other combustion products from the activation assembly to flow from the gas generator and into the stored gas housing before exiting the inflator through the ruptured first closure disk. When a propellant is used which generates combustible propellant gases, this reduces the potential for these propellant gases combusting within the air/safety bag and promotes their more efficient combusting inside the inflator housing.

A transfer tube can be disposed internally of and spaced from the gas generator housing. All of the propellant is disposed in the space between the gas generator housing and the transfer tube, and the transfer tube includes a plurality of ports. The output from the activation assembly is directed into the interior of the transfer tube and then out through its ports to ignite the propellant. This reduces the potential for the initiation of the activation assembly adversely impacting the structural integrity of the propellant. The transfer tube may also be used to direct the output from the activation assembly to the above-noted projectile to propel the same through the first closure disk.

The hybrid inflator can have multiple chambers. The inflator includes a first housing and a second housing assembly. The second housing assembly is interconnected with the first housing and is disposed interiorly thereof (e.g., concentrically disposed). The second housing assembly includes a first chamber in which an appropriate gas/heat-generating material or propellant is disposed. A second chamber is defined by the space between the first housing and the second housing assembly and contains an appropriate pressurized medium in the static state or prior to activation of the inflator. The second chamber is in constant fluid communication with the first chamber such that the first chamber also contains pressurized medium.

The second housing assembly can further include a third chamber. A first closure disk is associated with the third chamber and provides the initial isolation between the air/safety bag and the inflator. The third chamber is fluidly interconnectable with the second chamber, but is substantially isolated from the first chamber. As such, upon ignition of the propellant within the first chamber, propellant gases flow from the first chamber into the second chamber, and then into the third chamber. After the first closure disk is ruptured, the flow is established from the inflator to the air/safety bag.

The second housing assembly can include a central housing having a sidewall and two open ends. The inflator activation assembly is disposed within and closes one of the open ends of the central housing and is appropriately secured thereto (e.g., via welding). A partition is disposed within the interior of the central housing (e.g., via a press-fit) to define the first chamber of the second housing assembly together with the activation assembly. A diffuser assembly is disposed within and closes the other open end of the central housing and is appropriately secured thereto (e.g., via welding). The partition, due to its interface with the central housing and the lack of any ports in the partition, substantially limits any substantial fluid flow from the first chamber directly into the third chamber. Moreover, by press-fitting the partition into the central housing, this also allows the propellant to be loaded into the central housing after all welds, which are located near the propellant, have been made.

DETAILED DESCRIPTION

The present invention will be described with regard to the accompanying drawings which assist in illustrating various features of the invention. In this regard, the present invention generally relates to hybrid inflators for automotive inflatable safety systems. That is, the invention relates to an inflator which utilizes both a stored, pressurized gas and a gas and/or heat-generating propellant. Various types of hybrid inflators are disclosed in U.S. Pat. No. 5,230,531 to Hamilton et al. and co-pending U.S. patent application Ser. No. 08/680,273 filed Jul. 11, 1996, entitled "Hybrid Inflator," which are both assigned to the assignee of this application, and the entire disclosures thereof are hereby incorporated herein by reference in their entireties.

Figure 1:
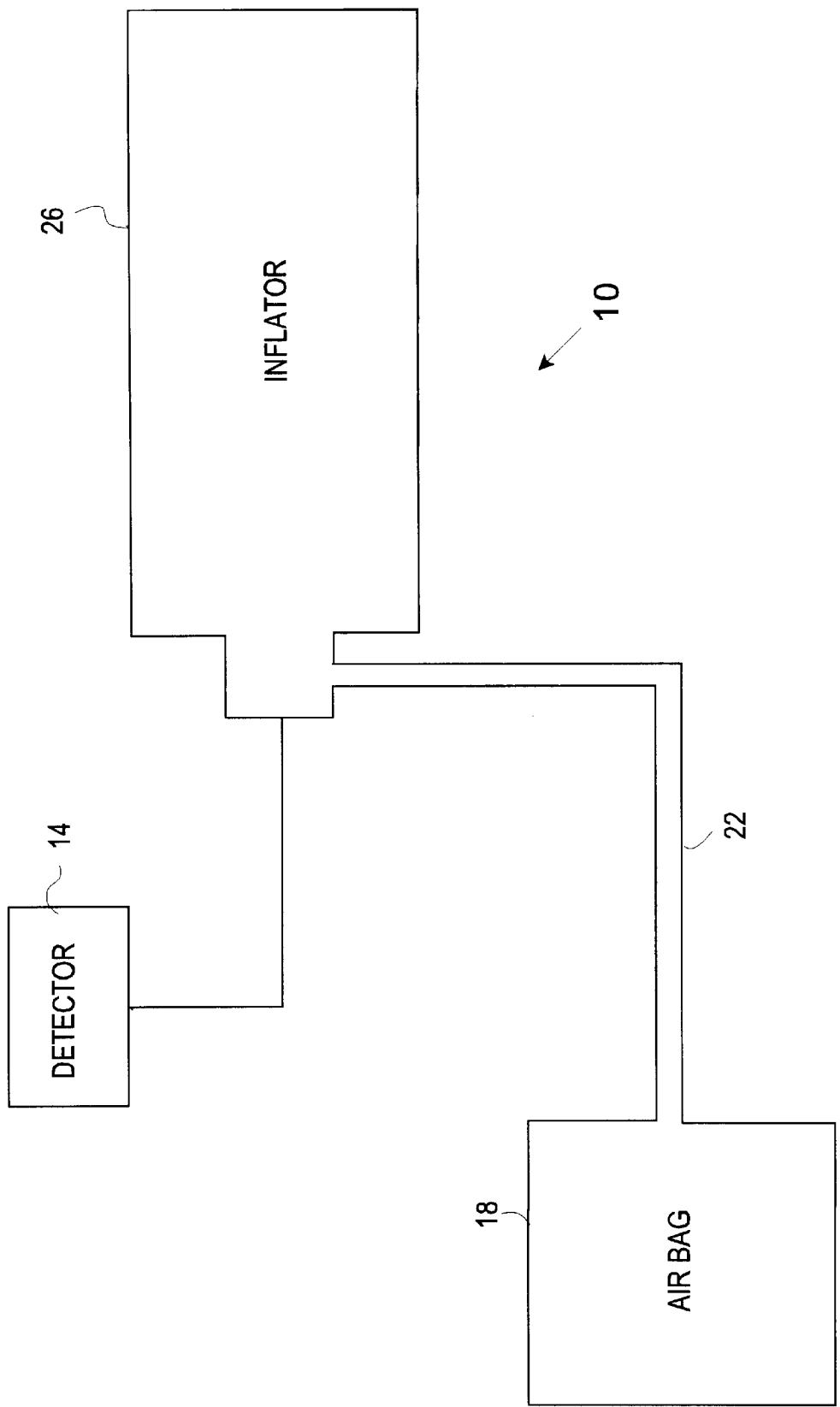
FIG. 1 is a schematic representation of an automotive inflatable safety system of the prior art.

One embodiment of a prior art automotive inflatable safety system is generally illustrated in FIG. 1. The primary components of the inflatable safety system 10 include a detector 14, an inflator 26, and an air/safety bag 18. When the detector 14 senses a condition requiring expansion of the air/safety bag 18 (e.g, a predetermined deceleration), a signal is sent to the inflator 26 to release gases or other suitable fluids from the inflator 26 to the air/safety bag 18 via the conduit 22.

Figure 2:
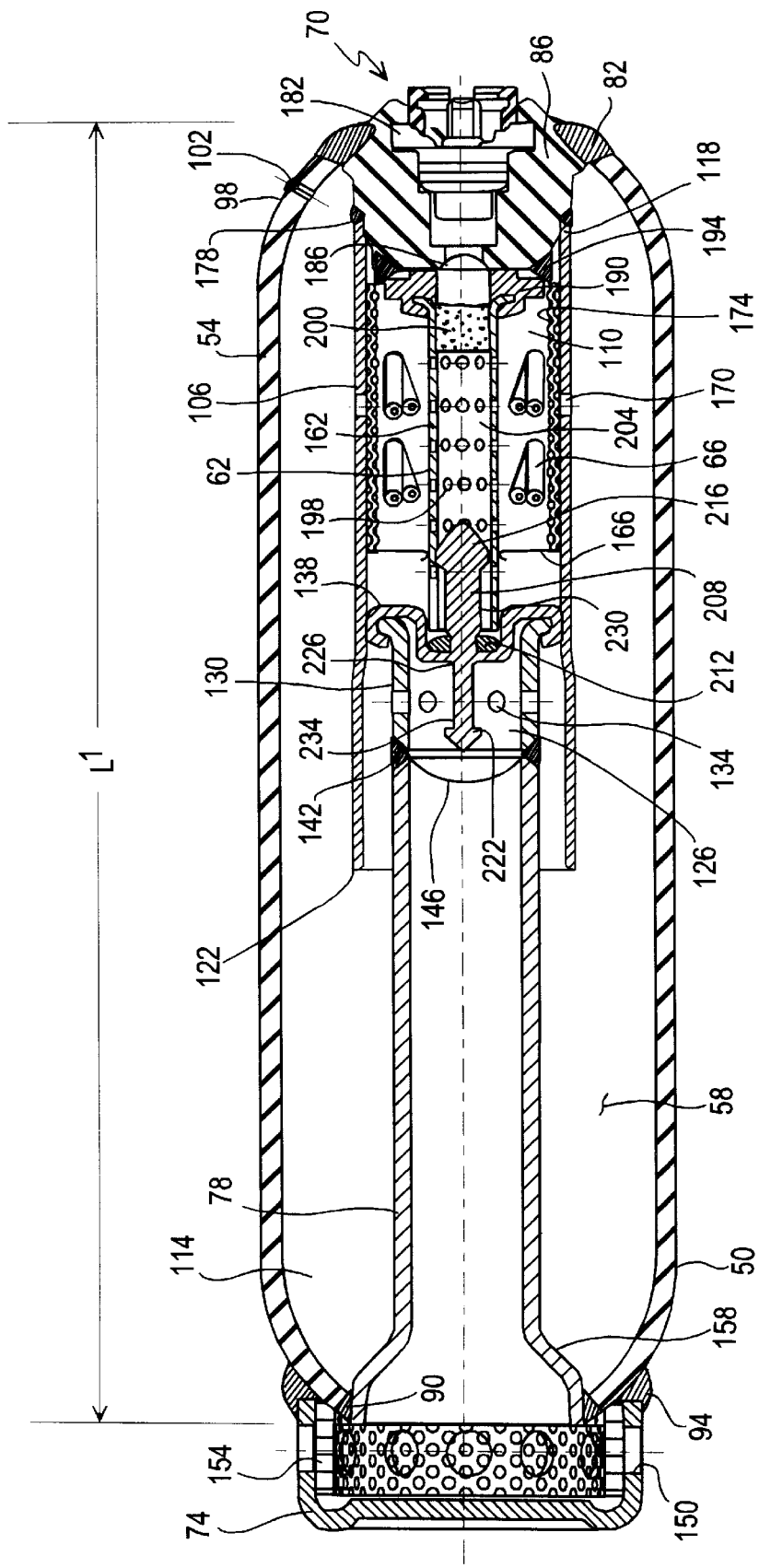
FIG. 2 is a cross-sectional view of an embodiment of a hybrid inflator of the prior art.

The prior art inflator 50 illustrated in FIG. 2 is a hybrid inflator and may be used in the inflatable safety system 10 of FIG. 1 in place of the inflator 26.

The prior art hybrid inflator 50 includes a cylindrical inflator or stored gas housing 54 which contains an appropriate pressurized medium 58 (e.g., a pressurized fluid and including one or more liquids and/or one or more gases), a cylindrical gas generator 62 which contains an appropriate gas/heat-generating material or propellant 66 for augmenting the flow to the air/safety bag 18 (FIG. 1) (e.g., at least about 85% of the heat used to augment the inflation capabilities of the system results from combustion of the propellant 66), an activation assembly 70 for both releasing the pressurized medium 58 (by establishing a flow path between the inflator 50 and the air/safety bag 18 (FIG. 1)) and igniting the propellant 66, and a diffuser 74 for directing the flow from the inflator 50 to the air/safety bag 18 (FIG. 1). Preferably, the inflator 50 utilizes the known compositions of gun type propellants and/or hybrid propellants, together with a multi-component pressurized medium (e.g., one component being oxygen and the other component being at least one inert fluid (e.g., gas/liquid)). As such, the inflator 50 further includes an afterburner tube 78 disposed "upstream" of the diffuser 74 to allow for sufficient combustion of the flow prior to exiting the inflator 50 through the diffuser 74.

Portions of the inflator 50 define a pressure vessel in that these portions contain the pressurized medium 58 in the static state or prior to initiation of the activation assembly 70. Generally, the activation assembly 70 closes one end of the stored gas housing 54, including a first weld 82 which interconnects the stored gas housing 54 and an activation assembly housing 86 of the activation assembly 70 and which provides a seal. The opposite end of the stored gas housing 54 is closed by the afterburner tube 78 and the diffuser 74 which are secured to the stored gas housing 54 by welds 90 and 94, respectively. Pressurized medium 58 is introduced into the completely assembled inflator 50 through a fill port 98 on the wall of the stored gas housing 54. When the desired amount of pressurized medium 58 has been provided to the inflator 50, the fill port 98 is sealed by a plug 102 which is appropriately secured to the stored gas housing 54 (e.g., a steel ball disposed within and/or over the fill port 98 which may be press-fit and/or welded therein).

The pressurized medium 58 is contained within multiple chambers within the inflator 50 during the static state, and these chambers are fluidly interconnected in a manner which defines the flow path for exiting the inflator 50 during operation. The gas generator 62 includes a gas generator housing 106 which is concentrically disposed within the stored gas housing 54 and which defines a first chamber 110. Propellant 66 is contained within this first chamber 110 in the gas generator housing 106. Fluidly interconnected with the first chamber 110 of the gas generator housing 106 is a second chamber 114 which contains pressurized medium 58 during the static state or prior to initiation of the activation assembly 70. The second chamber 114 is defined in part by the annular space between the stored gas housing 54 and the gas generator 62, and in part by the annular space between the stored gas housing 54 and the afterburner tube 78. The fluid interconnection between the first chamber 110 and the second chamber 114 is present at all times such that during the static state or prior to initiation of the activation assembly 70, the first chamber 110 within the gas generator housing 106 also contains pressurized medium 58.

The gas generator housing 106 includes a first end 118 and a second end 122. The first end 118 of the gas generator housing 106 interfaces with and is closed by a portion of the activation assembly 70 which assists in the retention of pressurized medium 58 within the inflator 50 in the static state as will be discussed in more detail below. The second end 122 of the gas generator housing 106 has a slightly larger diameter than the first end 118 of the gas generator housing 106, is open, and is disposed radially outwardly from a portion of the afterburner tube 78. This space may be considered as either a part of the second chamber 114 or as part of a flow path between the second chamber 114 and a third chamber 126 which is defined by an orifice sleeve 130.

Fluid communication between the second chamber 114 and the third chamber 126 is provided by at least one and preferably a plurality of orifice sleeve ports 134 which are radially spaced on the orifice sleeve 130 and which are open at all times. The orifice sleeve 130 interconnects the after burner tube 78 and the gas generator 62. One end of the orifice sleeve 130 is appropriately secured to a second end wall or partition or nozzle plate 138 of the gas generator 62 which provides for closure or near closure (may be slight gap in some embodiments) of one end of the first chamber 110 in the gas generator housing 106 (e.g,. by a crimped interconnection). The opposite end of the orifice sleeve 130 is interconnected with an end of the afterburner tube 78 by a weld 142. In order to seal the third chamber 126 to retain the pressurized medium 58 within the first chamber 110, second chamber 114, and third chamber 126 during the static state or prior to initiation of the activation assembly 70, a second closure disk 146 is disposed between an end of the afterburner tube 78 and the orifice sleeve 130 and is retained in this position by the weld 142. The second closure disk 146 provides the main isolation between the inflator 50 and the air/safety bag 18 (FIG. 1) and may be characterized as the output disk.

Note that the second closure disk 146 may be characterized as being disposed at an intermediate location within the inflator 50. In the illustrated embodiment, the second closure disk 146 is disposed at generally a mid portion of the stored gas housing 54 and is disposed interiorly thereof. Consider the distance between the two opposing ends of the stored gas housing 54 to be $L^1$. In one embodiment the above-noted 'intermediate' location of the second closure disk 146 may be characterized as being disposed at least about 40% of $L^1$ from both ends of the stored gas housing 54.

The afterburner tube 78 communicates with the third chamber 126 after the second closure disk 146 is ruptured or opened in a manner discussed in more detail below. The afterburner tube 78 in turn communicates with the diffuser 74 which includes a plurality of diffuser ports 150 and a diffuser screen 154. Flow exiting the diffuser 74 is then directed to the air/safety bag 18 (FIG. 1). The afterburner tube 78 and the diffuser 74 are part of an outlet passage for the inflator 50. Note that the end of the afterburner tube 78 which interfaces with the diffuser 74 has a divergent end section 158 which has a diameter larger than the end of the afterburner tube 78 which interfaces with the second closure disk 146. This divergent end section 158 reduces the velocity of the flow exiting the inflator 50.

The first chamber 110 once again is located within the gas generator 62, and is more specifically defined by a hollow transfer tube 162 which is concentrically disposed within the gas generator housing 106 and an annular retainer 166 which seats against the interior surface of the gas generator housing 106 and the exterior surface of the transfer tube 162. The propellant 66 is disposed radially outwardly of the transfer tube 162 (e.g., to reduce the potential for damaging the propellant 66 during ignition) and between the retainer 166 and the first end 118 of the gas generator housing 106 proximate the activation assembly 70.

At least one and typically a plurality of gas generator outlet ports 170 are disposed on the gas generator housing 106 to fluidly interconnect the stored gas housing 54 and the gas generator housing 106 at all times and particularly the first chamber 110 of the gas generator housing 106 where the propellant 66 is located. These outlet ports 170 are positioned on the gas generator housing 106 between the retainer 166 and the first end 118 of the gas generator housing 106. Most inflation gases resulting from combustion of the propellant 66 and any from the activation assembly 70 flow out of the gas generator housing 106 through the gas generator outlet ports 170 to augment the flow to the air/safety bag 18 (FIG. 1), although some moves past the nozzle plate 138 to mix with the gas in the diffuser 74. In order to reduce the potential for the combusting propellant adversely impacting the performance of the inflator 50, a screen 174 may be disposed in the interior of the gas generator housing 54 over at least the gas generator outlet ports 170.

The propellant 66 is ignited within the gas generator housing 106 by the activation assembly 70 which includes the activation assembly housing 86. The activation assembly housing 86 is attached to the stored gas housing 54 at a first weld 82 and also to the first end 118 of the gas generator housing 106 at a second weld 178 to achieve a preferably hermetic seal since both the stored gas housing 54 and the gas generator housing 106 contain pressurized medium 58 in the static state or prior to initiation of the activation assembly 70. The activation assembly housing 86 retains an appropriate initiator 182 (e.g., an electrically activatable squib or other suitable pyrotechnic device) which provides combustion products to cause the ignition of the propellant 66. In order to isolate the initiator 182 from the pressurized medium 58 within the inflator 50 and further to provide a seal for the inflator 50, a first closure disk 186 is disposed between the gas generator 62 and the initiator 182. In the illustrated embodiment, this is effected by disposing the first closure disk 186 between a first end wall 190 of the gas generator 62 (which is crimped onto one end of the transfer tube 162) and an end of the activation assembly housing 86 which are secured to each other by a third weld 194.

The cylindrical transfer tube or housing 162 is concentrically disposed within and relative to the gas generator housing 106, and is aligned with the initiator 182 to receive a "flow" of combustion by-products or inflation gases which are generated by initiation of the activation assembly 70. The propellant 66 is again disposed in the first chamber 110 in the gas generator housing 106, or radially outwardly from the transfer tube 162. As such, the transfer tube 162 reduces the potential for the initiation of the activation assembly 70 adversely impacting the propellant 66, principally by reducing the potential for having the pressure wave or pulse, produced from activation of the initiator 182, cracking the grains of the propellant 66 which would change the burn characteristics of the propellant 66. In order to communicate combustion products from the activation assembly 70 to the propellant 66 to ignite the same by direct contact therewith, at least one and preferably a plurality of transfer tube ports 198 are provided on the wall of the transfer tube 162. These transfer tube ports 198 may be radially disposed about the transfer tube 162 and longitudinally spaced along the length of the transfer tube 162.

The activation assembly 70 further includes an appropriate ignition/booster material 200 to augment the capabilities of the activation assembly 70 (e.g., an RDX/aluminum booster material having a composition of about 89 wt % RDX, 11 wt % aluminum powder, possibly with about 0.5 wt % to about 5.0 wt % hydroxypropyl-cellulose added replacing from about 0.5 wt % to about 5.0 wt % of the RDX and aluminum proportionally). The ignition/booster material 200 may be positioned between the initiator 182 and the propellant 66 in alignment with the discharge or output from the initiator 182. Activation of the initiator 182 ignites its combustible material, which in turn ignites the ignition/booster material 200. Combustion products from the initiator 182 and/or the ignition booster material 200 then ignite the propellant 66 by passing through the transfer tube 162 and its transfer tube ports 198 to directly contact the propellant 66 and ignite the same. Since the ignition/booster material 200 is in powder form, it is contained within a thin-walled cup 204. This cup 204 is disposed on one end of the transfer tube 162 on the inside thereof (e.g., being press-fit therein). The transfer tube 162 conveys combustion products for ignition of the propellant 66.

Initiation of the activation assembly 70 not only ignites the propellant 66, but it also establishes a flow path between the inflator 50 and the air/safety bag 18 (FIG. 1) by rupturing the second closure disk 146 which is again the main isolation between the inflator 50 and the air/safety bag 18. In this regard, the activation assembly 70 further includes a projectile/valve 208. This projectile/valve 208 is partially disposed within the end of the transfer tube 162 opposite the ignition/booster material 200, is aligned with both the initiator 182 and the ignition/booster material 200, is initially retained in a fixed position by a shear ring 212, extends through the second end wall 138 of the gas generator 62 and housing 106 beyond the end of the transfer tube 162, is axially aligned with the second closure disk 146, and is spaced from the second closure disk 146. Generally, the combustion products from the activation assembly 70 (the initiator 182 and/or the ignition/booster material 200) are partially directed down through the transfer tube 162 and exert a force on the projectile/valve 208 to 'break' the shear ring 212 and propel the projectile/valve 208 through the second closure disk 146. This allows pressurized medium 58, propellant/inflation gases, and other combustion products to flow from the second chamber 114, into the third chamber 126 through the orifice sleeve ports 134, into the afterburner tube 78 through the ruptured second disk 146, and into the diffuser 74 to exit the inflator 50 for direction to the air/safety bag 18 (FIG. 1).

The projectile/valve 208 of the activation assembly 70 provides a sealing function in addition to initiating the flow from the inflator 50 in the described manner. Specifically, the projectile/valve 208 forces most of the propellant/inflation gases and other combustion products from the activation assembly 70 within the first chamber 110 to flow out of the gas generator 62 through the gas generator outlet ports 170 and into the second chamber 114, although some moves past the nozzle plate 138 to mix with gas in the diffuser 74. This is provided by the configuration of the projectile/valve 208 and/or the manner in which the projectile/valve 208 interfaces with the gas generator 62. The projectile/valve 208 includes a first conically-shaped head 216 which projects toward the initiator 182 and which has a maximum diameter that is substantially equal but slightly less than the inner diameter of the transfer tube 162 such that the projectile/valve 208 may slide relative thereto. The projectile/valve 208 further includes a second conically shaped head 222 which projects toward the second closure disk 146 and which has a maximum diameter which is less than the maximum diameter of the first head 216. Interconnecting the first head 216 and the second head 222 is a body 226 which includes a first body section 230 and a second body section 234. The first body section 230 slidably interfaces with the second end wall 138 of the gas generator 62, while the second body section 234 extends from the first body section 230 beyond the second end wall 138 for interconnection with the second head 222. The second body section 234 has a smaller diameter than the first body section 230.

The projectile/valve 208 is retained within a fixed position in the static state or prior to activation of the activation assembly 70 by the shear ring 212. The annular shear ring 212 is seated within a groove formed on the first body section 230. The shear ring 212 is further retained between the second end wall 138 of the gas generator 62 and the end of the transfer tube 162. Once the activation assembly 70 is activated, the resulting ignition combustion products from the initiator 182 and the ignition/booster material 200 exert a force on the projectile/valve 208 which is sufficient to shear off the shear ring 212 to allow the projectile/valve 208 to be propelled through the second closure disk 146. The projectile/valve 208 is moved solely by these ignition combustion products, and not from combustion of the propellant 66. The projectile/valve 208 continues to be axially advanced by the combustion products from the activation assembly 70 until the first head 216 abuts the second end wall 138 of the gas generator. Since the diameter of the first head 216 exceeds the diameter of the hole or aperture in the second end wall 138 through which the projectile/valve 208 passes, the first head 216 seals the first chamber 110 such that substantial portions of the inflation gases flow out of the gas generator 62 via the gas generator outlet ports 170 and into the second chamber 114 and then exit the inflator 50 in the above-described manner. The pressure within the first chamber 110 due to the combustion of the propellant 66 maintains the projectile/valve 208 in this type of sealing engagement.

Figure 3:
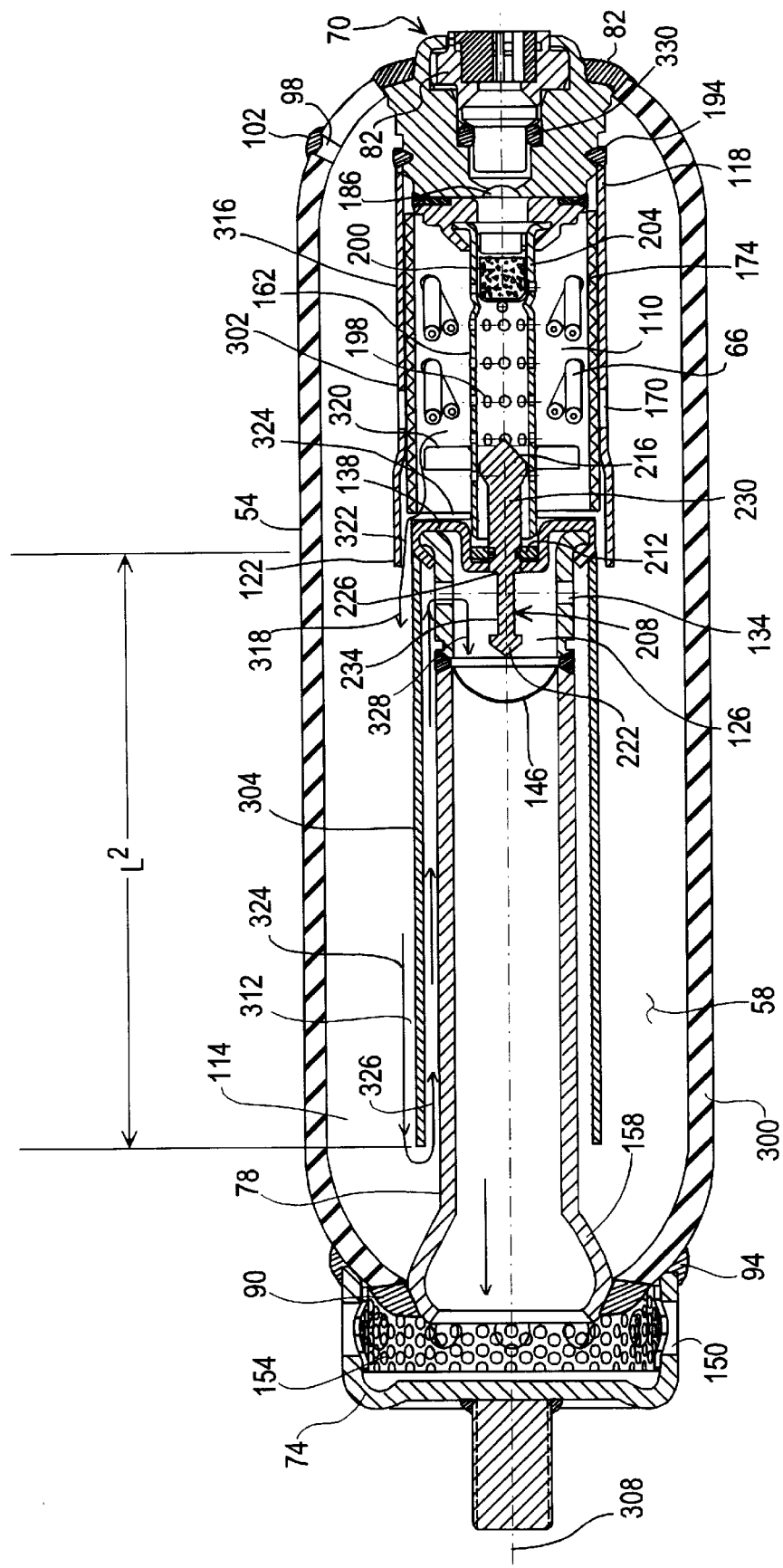
FIG. 3 is a cross-sectional view of an embodiment of a hybrid inflator of the present invention.

An embodiment of a hybrid inflator of the present invention which may be used in the inflatable safety system 10 of FIG. 1 is illustrated in FIG. 3. The hybrid inflator 300 differs from the prior art hybrid inflator 50 of FIG. 2 in that the hybrid inflator 300 is configured to provide efficient mixing of hot combustion gases from the combustion of the igniter/booster material 200 and the propellant 66 with the cooler pressurized medium 58. The mixing can cause an inflating gas having a relatively homogeneous composition and temperature to be outputted from the diffuser 146 into the air/safety bag 18. With respect to inflator temperature after activation thereof, it is desired that the temperature of inflation gases used to inflate the air/safety bag be sufficiently controlled or reduced to avoid potential erosion of certain metal parts including gas passageways within the inflator housing. A reduction in temperature is appropriate when a relatively high output is sought from the activated inflator. A relatively high output can be defined in the context of a representative hybrid inflator being tested using a 60-liter tank. When such a hybrid inflator is activated using such a tank, a relatively high output in the tank constitutes greater than about 500 KPa being developed in the tank when the hybrid inflator is activated. When such a relatively high output occurs, the temperature adjacent the outlet of the hybrid inflator is greater than 1000° C. (such as at least about 1100° C.). Consequently, in conjunction with a hybrid inflator that produces the relatively high output and such an associated temperature, it is desirable to reduce the temperature of inflation gases at the exit of the inflator housing.

The desired mixing for temperature reduction is achieved using an inner shroud 304 that (a) is disposed radially outward from the afterburner tube 78, radially inward of the exterior walls of the gas generator housing 316 (also referred to as the outer shroud), and symmetrically relative to the longitudinal axis 308 of the stored gas housing 54 and (b) preferably extends from a point adjacent to the gas generator 302, to a point beyond the second closure disk 146. An annular space 312, which is a part of the second chamber 114, is defined by the concentric afterburner tube 78 and inner shroud 304 through which the inflating gases must pass to exit the stored gas housing through the afterburner tube 78. The length "$L^2$" of the inner shroud 304 preferably ranges from about 0.25 to about 0.75 of the length $L^1$ of the stored gas housing 54. The length "$L^2$" of the inner shroud is also at least one-half the length of the afterburner tube 78 and at least a portion of the length of the inner shroud 304 is at least one-quarter (0.25) of the length of the afterburner member 78, as depicted in FIG. 3.

An additional flow path 318 from the first chamber 110 into the second chamber 114 for the combustion gases generated by the propellant 66 and the ignition booster material 200 is provided to complement the flow path from the first chamber 110 into the second chamber 114 defined by the gas generator outlet ports 170. The flow path 318 is defined by a first gap between the annular retainer 320 and the interior walls of the gas generator housing 316, a second gap between the open end 324 of the gas generator housing screen 174 and the second end wall 138, and the annular outlet 322 defined by the second end 122 of the gas generator housing 316 and the second end wall 138. The second end 122 of the gas generator housing 316 terminates before the second closure disk 146.

The operation of the hybrid inflator 300 is similar to that of the hybrid inflator 50 of FIG. 2. The detector 14 (FIG. 1) transmits a signal to the activation assembly 70 and the initiator 182 ignites the ignition/booster material 200. High temperature combustion products from the igniter/booster material ignite the propellant 66 which generates a high temperature and high pressure gas. The high temperature and high pressure combustion gas due to the ignition combustion products from the igniter/booster material force the projectile/valve 208 towards the diffuser end of the stored gas housing 54, thereby rupturing the second closure disk 146 and sealing the first chamber 110 from the third chamber 126. An "O" ring 330 prevents backflow of the combustion gases around the edges of the activation assembly 70 and consequent of the gases escape from the stored gas housing 54.

A first portion of the high temperature combustion gas is forced outward into the second chamber 114 through the gas generator outlet ports 170 while a second smaller portion is forced outward into the second chamber 114 along the additional flow path 318. The first portion of the combustion gas experiences a drop in flow velocity as it enters the second chamber 114 while the second portion experiences an increase in flow velocity along the flow path 318. As a result, turbulence in the combustion gases and the pressurized medium is induced near the second end 122 of the gas generator 302 where the lower velocity first portion combines with the higher velocity second portion. Some mixing of the combustion gases and the pressurized medium will occur in response to the turbulent flow conditions.

The partially mixed pressurized medium and combustion gases (collectively referred to as "inflation gases") move in a first direction 324 towards the diffuser end of the stored gas housing 54 and then in an opposing second direction 326 towards the activation assembly end of the stored gas housing 54. The first and second directions are substantially parallel to the longitudinal axis 308 of the stored gas housing 54. The restricted flow area of the annular outlet 312 (i.e., the decrease in area of flow upon entry into the annular outlet 312) causes an increase in flow velocity of the combustion gases and the pressurized medium leading to further mixing. Compared to the hybrid inflator 50 of FIG. 2, the flow path of the gases through the second chamber 114 is much longer in the hybrid inflator 300 as a result of the inner shroud 304. The change in flow direction and the longer flow path coupled with the changing flow directions can substantially prevent the occurrence of a flame after the inflation gases exit the diffuser 74.

The now fully mixed, substantially homogeneous (in composition and temperature) pressurized medium and combustion gases, or inflation gas, flows in a third direction 328 after passing through the orifice sleeve ports 134 into the third chamber 126, and through the afterburner tube 78. The third direction 328 is opposite to the second direction 326 but the same as the first direction 324. The inflation gas then passes through the diffuser 74 and into the air/safety bag 18 (FIG. 1).

The inflation gas has a substantially lower temperature than the combustion gases. This can prevent a change in size (i.e., enlargement) of the orifice sleeve ports 134 due to passage of relatively hot inflation gas into the afterburner tube 78.

The foregoing description of the invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended claims be construed to include alternative embodiments to the extent permitted by the prior art.

What is claimed is:

1. An apparatus for controlling flow of inflation gases, comprising:

an inflator housing having a longitudinal extent;

an initiator assembly connected to said inflator housing for use in igniting propellant;

a gas generator having a length connected to said inflator housing for generating propellant gas, said gas generator having a first gas flow path and a second gas flow path, wherein said first gas flow path is substantially perpendicular to said length of said gas generator and said second gas flow path is downstream of said first gas flow path and is substantially parallel to said length of said gas generator;

stored gas contained in at least said inflator housing;

outlet means including an exit associated with said inflator housing for receiving the inflation gases;

said outlet means including an afterburner member having a length and disposed in said inflator housing for delivering the inflation gases to said exit;

means operatively associated with said gas generator for mixing the inflation gases, including at least one of the propellant gas and the stored gas, said means for mixing including an inner shroud having a length and located in said inflator housing outwardly of said afterburner member and with said inner shroud length extending along at least a portion of said length of said afterburner member, wherein the inflation gases move in a first direction outwardly of said inner shroud toward said exit and then in a second direction opposite said first direction, between said inner shroud and said afterburner member and so that the temperature of the inflation gases adjacent said outlet means is reduced; and outlet closure means disposed in said afterburner member for blocking passage of the inflation gases until after said initiator assembly is activated, wherein said inner shroud extends a first distance from adjacent said outlet closure means towards said exit and extends a second distance from adjacent said outlet closure means towards said initiator assembly, with said first distance being greater than said second distance.

2. An apparatus, as claimed in claim 1, wherein:

said outlet means includes an inlet for the inflation gases that are to escape from said inflator housing using said exit and wherein said inner shroud is used in controlling flow of the inflation gases to substantially prevent any change in size of said inlet.

3. An apparatus, as claimed in claim 1, wherein:

said inner shroud has a length in said inflator housing of at least about 0.25 of said longitudinal extent of said inflator housing.

4. An apparatus, as claimed in claim 1, wherein:

said inner shroud has a length in the range of about 0.25–0.75 of said longitudinal extent of said inflator housing.

5. An apparatus, as claimed in claim 1, wherein:

said inner shroud has a length different from a length of said gas generator and said afterburner member has a length and in which said length of said inner shroud is at least one-half said length of said afterburner member.

6. A method for controlling gas flow in an inflation apparatus, comprising:

providing stored gas in a hybrid inflator including an inflator housing having a length, a gas generator having an end and a length, an inner shroud and outlet means having an exit;

causing propellant gas to be generated in said gas generator, with at least some of said propellant gas flowing out of said end of said gas generator substantially parallel to said gas generator length and between said inflator housing and said inner shroud; and controlling, after said causing step, inflation gases, comprising at least one of the propellant gas and the stored gas, to move in a first direction toward said exit for a distance at least 0.25 of said length of said inflator housing and then to move in a second, opposite direction away from said exit for a distance at least 0.25 of said length of said inflator housing in order to reduce the temperature of the inflation gases adjacent said outlet means; and outletting the inflation gases from said outlet means.

7. A method, as claimed in claim 6, wherein:

said controlling step includes using said inner shroud to cause the inflation gases to move in said first direction towards said exit.

8. A method, as claimed in claim 6, wherein said outletting step includes rupturing an outlet closure disk and said controlling step includes using said inner shroud that extends beyond said outlet closure disk to cause the inflation gases to move in said first direction and then said second direction.

9. A method, as claimed in claim 6, wherein:

said outletting step includes receiving the inflation gases in an inlet and said controlling step includes mixing the inflation gases to reduce the temperature that said inlet is subjected to due to the heat of the propellant gas in order to substantially prevent a change in size of said inlet.

10. A method, as claimed in claim 6, wherein:

said controlling step includes increasing the path taken by the inflation gases before passing from said hybrid inflator by using said inner shroud having a length and an afterburner member having a length, with at least portions of said inner shroud extending along at least portions of said afterburner member and wherein the inflation gases move in said second direction away from said exit between said inner shroud and said afterburner member to substantially prevent the occurrence of flame due to the inflation gases after the inflation gases exit said hybrid inflator.

11. A method, as claimed in claim 10, wherein:

said inner shroud length is different from said gas generator length and said afterburner member length and in which said length of said inner shroud is at least one-half said length of said afterburner member.

12. An apparatus for controlling flow of inflation gases, comprising:

an inflator housing including a chamber and having a length;

an initiator assembly connected to said inflator housing for use in igniting propellant;

a gas generator having said propellant for generating propellant gas and including a gas generator housing, a first end and a second end, with said first end being relatively adjacent to said initiator assembly;

stored gas contained in at least said inflator housing;

outlet means associated with said inflator housing for receiving the inflation gases and having an exit from which the inflation gases escape from said inflator housing;

said outlet means including an afterburner member disposed in said inflator housing having a first end and a second end, with said second end being spaced from said first end by a length of said afterburner member, said first end being adjacent to said second end of said gas generator and said afterburner member length extending towards said exit;

means operatively associated with said gas generator for mixing the inflation gases, including at least one of the propellant gas and the stored gas, said means for mixing including an inner shroud located in said inflator housing outwardly of said afterburner member, wherein a passageway is disposed between said gas generator housing and said inner shroud from which at least some of the propellant gas passes into said chamber of said inflator housing and in which the propellant gas moves in a first direction outwardly of said inner shroud towards said exit and then in a second direction, opposite said first direction, between said inner shroud and said afterburner member and so that the temperature of the inflation gases adjacent said outlet means is reduced, said inner shroud having a length substantially starting at said first end of said afterburner member and extending in a direction towards said exit, said length of said inner shroud being at least 0.25 of said length of said inflator housing; and outlet closure means for blocking passage of the inflation gases until after said initiator assembly is activated.

13. An apparatus for controlling the flow of inflation gases, comprising:

an inflator housing having a length;

an initiator assembly connected to said inflator housing for use in igniting propellant;

a gas generator having said propellant for generating propellant gas and including a gas generator housing with an end;

stored gas contained in at least said inflator housing;

outlet means associated with said inflator housing for receiving the inflation gases and having an exit from which the inflation gases escape from said inflator housing;

said outlet means including an afterburner member disposed in said inflator housing for delivering the inflation gases to said exit, said afterburner member having a length;

means operatively associated with said gas generator for mixing the inflation gases, including at least one of the propellant gas and the stored gas, said means for mixing including an inner shroud having a length and located in said inflator housing outwardly of said afterburner member, wherein at least some of the propellant gas flows out of said end of said gas generator housing and between said inflator housing and said inner shroud and the propellant gas moves in a first direction outwardly of said inner shroud toward said exit and then in a second direction, opposite said first direction, between said inner shroud and said afterburner member and so that the temperature of the inflation gases adjacent said outlet means is reduced; and an outlet closure member that blocks passage of the inflation gases until after said initiator assembly is activated, with at least a portion of said length of said inner shroud being at least 0.25 of said length of said afterburner member and with said portion of said inner shroud length starting from said outlet closure member and extending towards said exit of said outlet means.

* * * * *